Dec. 30, 1958  E. M. LAUB  2,866,269
WEDGE HOOK
Filed Aug. 10, 1956
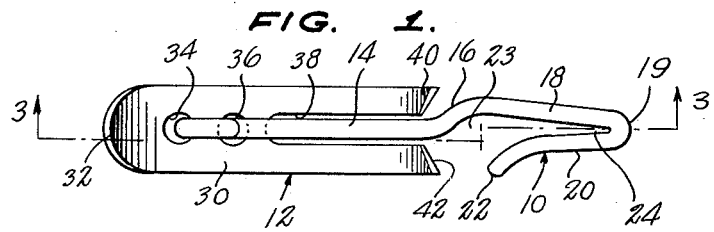
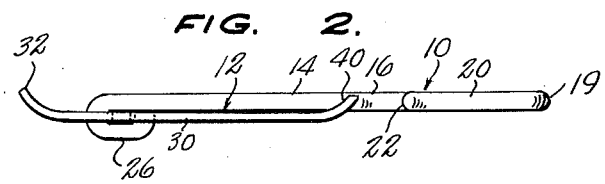
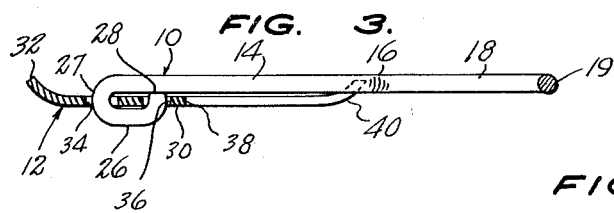
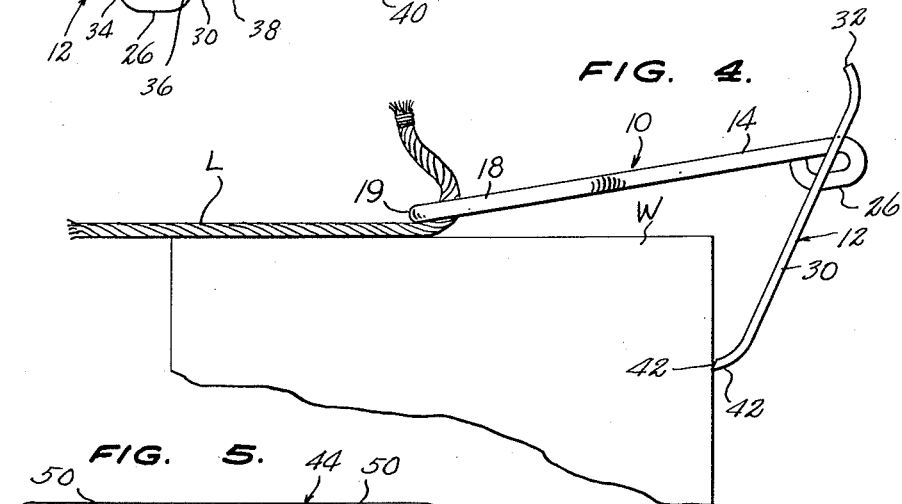
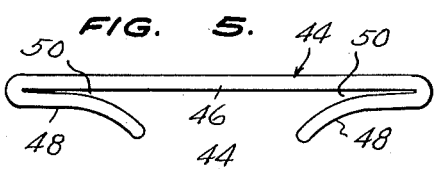
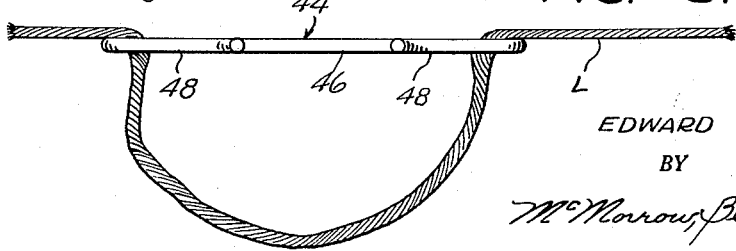
INVENTOR.
EDWARD M. LAUB,
BY
McMorrow, Berman & Davidson
ATTORNEYS.

United States Patent Office 2,866,269
Patented Dec. 30, 1958

2,866,269

WEDGE HOOK

Edward M. Laub, Essington, Pa.

Application August 10, 1956, Serial No. 603,310

1 Claim. (Cl. 33—85)

This invention relates to line connecting devices, and more particularly has reference to a hook-like member, having a wedge-shaped throat or recess in which any of various types of lines may be quickly and securely engaged.

The main object of the present invention is to provide a swift and easily usable means for fastening any of various sizes and types of lines to an object, without the use of knots.

Another object is to provide a device as stated which can be disengaged from the line with the same speed and ease as is characteristic of the device when the line is being connected thereto.

A further object is to provide a line connector having a substantial versatility as regards the various environments in which it can be used. To this end, the invention is adapted for use in connecting clotheslines to posts, and is further adapted for use in mooring the lines of small boats, the device further being usable as a boat hook, as a means for connecting the line of a plumb bob, and as a line holder for bricklayers.

A further object is to provide a device of the character stated which when in use as a bricklayer's line holder, is novelly shaped, and is connected to an equally novelly shaped member, in a manner that will permit the line holder to be swiftly engaged with the corner of a brick wall.

A further object, when the invention is incorporated in a bricklayer's line holder, is to permit the line holder to be folded flat when not in use, so as to be easily carried about in one's pocket.

Yet another object is to form a device of the character described which will be very inexpensively constructed, but will yet be of substantial strength.

Another object is to form the device in a manner that will permit it to hold a substantial number of different line sizes.

Yet another object is to form a wedge hook as described in double form, in a manner that will permit it to take up slack in lines such as those used for the purpose of providing temporary boat moorings.

Other objects will appear from the following description, the claim appended thereto, and from the annexed drawing, in which like reference characters designate like parts throughout the several views, and wherein:

Figure 1 is a top plan view of a device formed in accordance with the present invention;

Figure 2 is a side elevational view thereof;

Figure 3 is a longitudinal section on line 3—3 of Figure 1;

Figure 4 is a side elevational view of the device, showing the side opposite that seen in Figure 2, as it appears when in use for holding a bricklayer's line;

Figure 5 is a top plan view of a modified construction in which the hook is double-ended; and Figure 6 is a side elevational view of the device of Figure 5 as it appears when in use for the purpose of taking up slack in a line.

Referring to the drawings in detail, in Figures 1–4 there is shown a bricklayer's line holder in which is incorporated a wedge hook 10 formed according to the present invention. The line holder, all parts of which, so far as is known, are novel, includes in addition to the wedge hook a support or base plate generally designated 12.

The wedge hook 10 is formed from a length of relatively rigid stout wire material of any suitable gauge, it being understood that the gauge of the wire would depend upon the use to which the hook would be put in holding lines of various sizes. In any event, the shape, rather than the particular thickness of the wire and the wedge hook is thus formed with an inner end portion formed to include an elongated, straight shank 14 merging at its outer end into a laterally offset portion 16 which in turn merges into a straight outer shank portion 18. Shank portion 18 is, in the illustrated embodiment, of a length approximately two-thirds that of the shank 14, and as will be noted from Figure 1, the shank portion 18 at its outer end terminates substantially upon a line drawn in extension of the longitudinal median of the shank 14, the portion 18 being disposed at a low acute angle to said line. Portion 18 at said outer end thereof merges into a bight portion 19 which in turn merges into a hook portion 20 of a length slightly less than that of the shank portion 18. Hook portion 20 is also at a low acute angle to the line drawn in extension of the longitudinal median of shank 14, being disposed at the side of said line opposite that at which shank portion 18 is disposed. Hook 20 extends at an acute angle, also, to the length of shank portion 18 for a substantial part of the length of the hook portion. At its free end, hook portion 20 is integrally formed with a laterally, outwardly curving extension 22. There is thus defined between the extension 22 and the offset 16 a wide entrance throat 23. Throat 23 extends obliquely to the length of shank 14 and merges into an elongated, wedge-shaped recess 24 in which a line or cord L is adapted to be wedgingly engaged.

When the wedge hook 10 is used alone, it has general utility as a line connector. Any of various cords or lines L can be swiftly moved through the entrance throat 23 and the wedge shaped recess 24, and will be wedgingly engaged in said recess 24.

In Figures 1–4, however, the device is shown in use as a bricklayer's line holder and accordingly, as part of the present invention wedge hook 10 is swingably mounted on the base plate or bar 12.

Plate 12 is formed from a length of wide, flat, rigid sheet stock, and includes a rectangular, planiform body portion 30 having an outer end portion 32 transversely curved through less than 90 degrees out of the plane of the body portion. Adjacent the curved outer end portion 32 the body portion is formed with a circular opening 34 located medially between opposite sides thereof, and spaced longitudinally of the body portion from the opening 34 is a second circular opening 36. The shank 14 of hook 10 is formed with an oblong loop 26, having a bight part 27 loosely extending through opening 34 and an end 28 similarly loosely positioned with a loop 26. The width of loop 26 and the looseness with which said loop is engaged in the openings 36, 34 causes the hook 10 to be rockably mounted upon the base plate. The hook rocks between a first position shown in Figure 2, in which position all portions of the hook with the exception of the loop 26 lie in a plane closely spaced from and parallel to the plane of the portion 30, and a use position shown in Figure 4, in which the plane of hook 10 is related at an angle of approximately 80 degrees to the plane of body portion 30.

In the inner end portion of plate 12, there is formed a longitudinally and centrally extending slot 38 opening upon the inner extremity of said plate 12. The inner end portion of plate 12 is transversely curved out of the plane of the plate as at 4, defining teeth at opposite sides of the slot 38. The teeth have end edges 42 which have a compound bevel, said end edges diverging in a direction toward the inner extremity of the base plate to form sharp tips on the teeth at opposite sides of the base plate.

In use of the bricklayer's line holder (see Figure 4) the base plate is rocked relative to the wedge hook, or vice versa, and teeth 40 engaged in the surface of a wall W at one end of the wall. A line L is wedgingly engaged in recess 24, and due to the fact that the loop 26 binds upon the edges of openings 34, 36 to limit spreading of the hook and base plate, the line will be securely engaged against slippage. Further, the disposition of the base plate and hook at an angle of approximately 80 degrees to each other causes the line-receiving end of the hook to be disposed adjacent the surface of the wall W so that the line will be held directly in contact with or closely spaced from said surface.

In Figures 5 and 6 there is shown a modified construction. In this form, the hook has been generally designated 44, and may be used for taking up slack in a line L. To this end, the hook has an elongated, straight shank 46 integral at its opposite ends with hook portions 48 the free ends of which curve laterally outwardly from the length of the shank 46 to define a wedge-shaped recess 50 engaging the line at selected locations along the length of the line.

As will be appreciated, the device has general utility for the various purposes stated in the objects, and can be used to advantage in holding any of various sizes, types, and lengths of lines. At the same time, the device is very inexpensive, and is compactly formed so as to occupy a minimum amount of space when in use, and is characterized by the ease and speed with which a line may be connected to or disconnected from the same.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A bricklayer's line holder comprising a base plate formed at one end with teeth adapted to engage in the surface of a wall; and a line connector pivotally connected at one end to the base plate to swing outwardly therefrom, said line connector having a hook means at its other end formed with a wedge-shaped, line-receiving recess, said base plate being formed with longitudinally spaced openings, the line connector having a loop at said one end thereof loosely engaged in said openings to provide a pivotal connection of the line connector to the base plate, said loop and openings lying in the plane of swinging movement of the line connector, said loop being elongated in the direction of the length of the line connector so as to bind against the edges of the openings on swinging of the line connector outwardly from the base plate, whereby to limit the outward swinging movement of the line connector.

References Cited in the file of this patent

UNITED STATES PATENTS

| | | |
|---|---|---|
| 303,297 | Langford | Aug. 12, 1884 |
| 304,718 | Ford | Sept. 9, 1884 |
| 543,129 | Dunn | July 23, 1895 |
| 765,250 | McPherson | July 19, 1904 |
| 858,473 | Sanders | July 2, 1907 |
| 977,384 | Glynn | Nov. 29, 1910 |
| 1,344,224 | Gross | June 22, 1920 |
| 1,550,451 | Pardey | Aug. 18, 1925 |

FOREIGN PATENTS

| | | |
|---|---|---|
| 42,278 | Germany | Feb. 22, 1888 |
| 444,478 | France | Oct. 18, 1912 |
| 139,275 | Switzerland | Feb. 24, 1953 |